US008566149B2

(12) United States Patent
Young (10) Patent No.: US 8,566,149 B2
(45) Date of Patent: Oct. 22, 2013

(54) METHOD OF SHARING REVENUE IN AN INTERNET PRINTING SYSTEM

(75) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 608 days.

(21) Appl. No.: 12/142,307

(22) Filed: Jun. 19, 2008

(65) Prior Publication Data

US 2009/0319371 A1    Dec. 24, 2009

(51) Int. Cl.
*G06Q 40/00*    (2012.01)
(52) U.S. Cl.
USPC ........................................................ 705/14
(58) Field of Classification Search
USPC ......................................... 705/14, 35–37, 26
See application file for complete search history.

(56) References Cited

U.S. PATENT DOCUMENTS

| | | | |
|---|---|---|---|
| 6,877,031 B2 * | 4/2005 | Watanabe et al. ............. | 709/217 |
| 6,882,439 B2 | 4/2005 | Ishijima | |
| 7,461,022 B1 * | 12/2008 | Churchill et al. ............... | 705/37 |
| 7,734,621 B2 * | 6/2010 | Weitzman et al. ............ | 707/720 |
| 7,788,130 B2 * | 8/2010 | Feeley et al. .................. | 705/14.4 |

OTHER PUBLICATIONS

"The ultimate marketing machine", The Economist print edition, Jul. 6, 2006, obtained at: http://www.economist.com/business/PrinterFriendly.cfm?story_id=7138905.

"Coupons Reinforce Print and Online Advertising", ZiXXo Inc., ZiXXo Mediacenter, ZiXXo for Affiliates, obtained on Aug. 24, 2007 at: http://www.zixxo.com/mediacenter/ZiXXo_MediaCenter_Affiliates.html.
http://www.google.com/chrome/intl/en/p/cloudprint.html (2011).

* cited by examiner

*Primary Examiner* — Charles Kyle
*Assistant Examiner* — Siegfried E Chencinski
(74) *Attorney, Agent, or Firm* — Fitzpatrick, Cella, Harper & Scinto (57) ABSTRACT

The present invention shares revenue in an Internet printing system comprising a search engine provider, a host computer capable of browsing the Internet, and an advertisement sponsor. A user of the host computer registers with the search engine provider as a participant in an Internet advertisement revenue sharing system managed by the search engine provider. The user of the host computer conducts a search utilizing a web page of the search engine provider and the search results in a search result page being displayed on a browser of the host computer. The user of the host computer selects an option to print the displayed search result page on a printer connected to the host computer. The host computer generates print data to print out the search result page together with advertisement data and submits the generated print data to the printer for printing. The host computer receives a confirmation message from the printer confirming that the printout of the generated print data, which includes the advertisement data, was successful. The host computer notifies the search engine provider that the printout of the print data, that included the advertisement data, was successful. The search engine provider then charges the advertisement sponsor for the printing of the advertisement data included in the printout. Finally, the search engine provider credits an account of the registered user a portion of the amount charged to the advertisement sponsor for the printing of the advertisement data.

22 Claims, 7 Drawing Sheets

Results 1 - 10 of about 5,652,461 for Italian Restaurant

A. Lou Malnati's Pizzeria - River North
439 N Wells St, Chicago, IL
(847) 562-1918 - *****

B. Giordano's
56 E Superior St, Chicago, IL
(312) 951-0747 - *****

C. Tony's
410 Market St, St Louis, MO
(314) 231-7007 - *****

D. Carmelo's Italian Restaurant
504 E 5th St, Austin, TX
(512) 477-7497 - *****

E. Cunetto House of Pasta
5453 Magnolia Ave, St Louis, MO
(314) 781-1135 - *****

F. Demo's Steak & Spaghetti House
300 Commerce St, Nashvile, TN
(615) 256-4655 - *****

G. Ann's Italian Restaurant
5969 S. 108th Place, Hales Corners, WI
(414) 425-5040 - *****

H. Maggiano's Little Italy
500 16th St # 150, Denver, CO
(303) 260-7707 - *****

I. Zia's Restaurant
5256 Wilson Ave, St Louis, MO
(314) 776-0020 - *****

J. Otto Restaurant Enoteca Pizza
15th Ave, New York, NY
(212) 995-9559 - *****

FIG. 7

METHOD OF SHARING REVENUE IN AN INTERNET PRINTING SYSTEM

BACKGROUND OF THE INVENTION

1. Field of the Invention

The present invention concerns sharing of Internet advertising revenue. More specifically, the invention pertains to the sharing of revenue between an advertisement sponsor, a search engine provider, and an end user of the search engine by crediting the end user a portion of advertising revenue collected by the search engine provider from the advertisement sponsor after confirming that the end user has printed out an advertisement on a printout of a search result web page.

2. Related Background Art

Currently, a common method for advertising on the Internet is a system called pay-per-click advertising or PPC advertising. PPC advertising is an arrangement between webmasters, acting as publishers, and advertisers or advertisement sponsors, in which the webmasters display clickable links leading to the advertiser's websites, in exchange for a charge-per-click of the link. In this system, the advertisers may be susceptible to overcharging for the clicking of links. A common example in which online advertisers may be overcharged for clicked links is click fraud. Click fraud occurs when a person, automated script, or computer program imitates a legitimate user of a web browser clicking on an advertisement link, for the purpose of generating a charge-per-click without having actual interest in the target of the advertisement's link. In this case, the advertiser may be excessively charged for the false clicks.

Another example of inaccurate charging of online advertisers is when a user accidentally clicks on an advertiser's link. When a user accidentally clicks an advertiser's link, the user may quickly return to the previous website without actually viewing the advertiser's website. Yet another example of inaccurate charging of online advertisers is when a user clicks on an advertiser's link, but the web browser malfunctions and never displays the advertiser's website. In this case, the advertiser may be charged at the moment the user clicked the link with no assurance that the user actually viewed the advertiser's website or advertisement information. Accordingly, in each of these examples (click fraud, accidental clicking, and web browser error), advertisers may have to pay for advertisements that are, in reality, not viewed by the target audience.

In addition, PPC advertising does not currently provide an incentive for Internet users to click on an online advertiser's link. After a user conducts a search, there is no real motivation for the user to depart from the search results and click on an advertiser's link to view advertisements in the middle of conducting an Internet search. Of course, if the user is interested in the advertisement and were to click on the advertiser's link, the user is provided access to the advertiser's website, but the user is not provided with a monetary benefit for viewing the advertiser's website.

Moreover, in PPC advertising, advertisers generally bid on keywords that they believe their target market would type in a search bar when searching for a product or service. When a user enters a keyword query matching the advertiser's keyword bidding list, the advertiser's advertisement may or may not be shown depending on how much the advertiser bids. The list of advertiser links appears in order of the amount of the bid and is usually listed on the side of the web page or sometimes on the top of the web page, or what may be referred to as the "gutters" of the web page. Therefore, even though an advertiser is bidding on keywords and the advertiser's links are being listed with the search results of a search page, a strong possibility exists that the user will not click on the advertiser's link.

Thus, what is needed is an online advertising scheme that will provide end users with some monetary incentive to view advertisers' websites and a way for advertisers to better ensure that the end user has actually viewed their advertisements.

SUMMARY OF THE INVENTION

The present invention addresses the foregoing problems by providing a system for sharing of revenue between an advertisement sponsor, a search engine provider, and an end user of the search engine by crediting the end user a portion of advertising revenue collected by the search engine provider from the advertisement sponsor after it is confirmed that the end user has printed out an advertisement on a printout of a search result web page.

According to the invention, a user of a host computer capable of browsing the Internet registers with a search engine provider (e.g. Google™, Yahoo!®, or MSN®) as a participant in an Internet advertisement revenue sharing system, which may be managed by the search engine provider. The user registers with the search engine provider by, for example, signing up through the search engine provider's website, calling the search engine provider by telephone, or sending a registration form to the search engine provider through the postal service. When browsing the Internet, the user of the host computer conducts a search utilizing a web page of the search engine provider by entering search terms in the search engine web page, whereby a search result page is displayed on a browser of the host computer. The search results may include, but are not limited to, a list of relevant web sites, a list of products or services, a map, or driving directions related to the input search terms. The user of the host computer may then select an option to print the displayed search result page on a printer connected to the host computer. When selecting the print option to print the displayed results page, the user is presented with the option to print the results page either without advertisements, or to print the results page with advertisements as part of the revenue sharing system.

If the user opts to print the results page with advertisements as part of the revenue sharing system, the host computer generates print data that includes the search results page together with advertisement data and submits the generated print data to the printer for printing. In one embodiment, the search engine provider downloads both the search result page and prepared advertisement data for the printout to the host computer, wherein the downloaded advertisement data for the printout is handled by a plug-in to the browser that prepares a print job that includes the search result page and the downloaded advertisement data. In another embodiment, the search engine provider prepares advertisement data and embeds the advertisement data in the search results page itself. The search engine provider then creates a new HTML web page containing the search results and the embedded advertisement data and downloads the new HTML web page for the printout to the host computer.

After the print job is submitted to the printer, the host computer confirms whether or not the printing of the job was successful. If so, the host computer notifies the search engine provider that the printout of the print data, that included the advertisement data, was successful. After being notified that the printout was successful, the search engine provider charges the advertisement sponsor for the printing of the advertisement data included in the printout. The amount charged to the advertisement sponsor may vary, depending on, for example, the size of the advertisement data, the location of the advertisement data on the printout, or the detail and quality of the advertisement data. Alternatively, the amount charged to the advertisement sponsor may be a fixed rate per advertisement data. The search engine provider then credits an account of the registered end user a portion of the amount charged to the advertisement sponsor for the printing of the advertisement data. The user may then exchange the credits, for example, to get cash back, to get new printer ink cartridges, or to get other merchandise.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
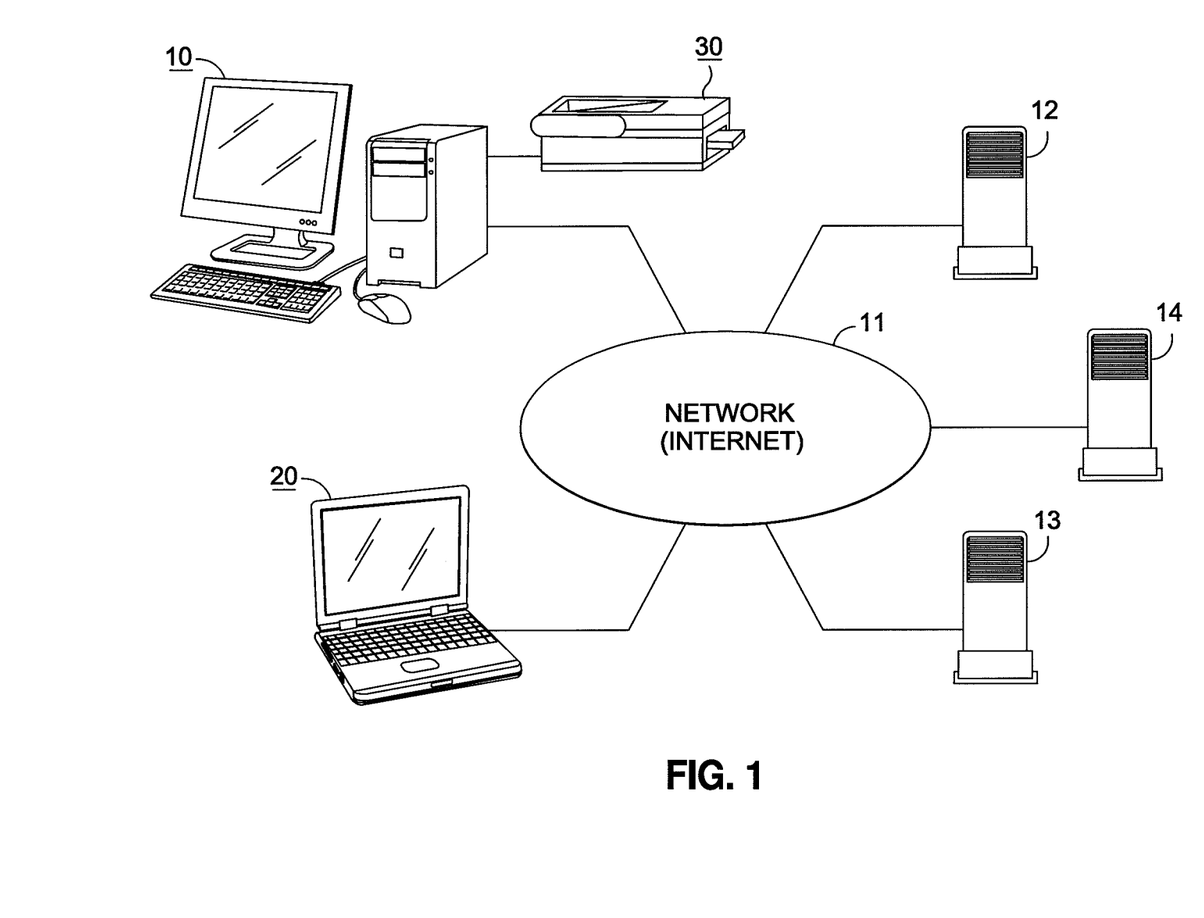
FIG. 1 depicts an example of a computing environment in which the invention may be employed.

FIG. 1 depicts an example of a computing environment in which the invention may be employed. Briefly, the invention is directed to the sharing of revenue between an advertisement sponsor (AS), a search engine provider (SEP), and an end user of the search engine. Thus, as seen in FIG. 1, the invention may be employed in an environment that includes personal computer workstation 10 or laptop computer 20 that are connected to a network 11, which is preferably a world wide network such as the Internet. In this manner, computer workstation 10 or laptop 20 can communicate with any of various servers connected to the Internet so as to access various web-sites. For example, computer workstation 10 can communicate with server 14 for an Internet Service Provider (ISP), or server 12 for a search engine provider (SEP) as seen in FIG. 1. Of course, servers 12 and 14 are not necessarily the only servers that may be connected to the Internet and numerous additional servers may also be included. For instance, server 13 for an advertisement sponsor (AS) may also be included on the network, and other servers that host websites and various content that can be accessed via the Internet may also be included. Rather, servers 12 and 14 are merely representative examples and are depicted in FIG. 1 merely for illustrative purposes. Preferably, however, ISP server 14 is owned and operated by an Internet Service Provider so as to provide computer workstation 10 with access to the Internet. SEP server 12 is preferably a server owned and operated by an Internet Search Engine Provider, such as Google™, Yahoo!®, or MSN®. The end user can access SEP server 12 to conduct an internet search, whereby SEP server 12 provides computer workstation 10 with a search results page.

Computer 10 is also preferably connected locally to printer 30, either via a local connection or via a local area network connection (not shown). Printer 30 may be any type of printing device that prints images. For example, printer 30 may be a laser or bubble-jet printer, and may also be a multi-function device which is capable of operating as both a printer and a facsimile device. As will be described in more detail below, printer 30 communicates with computer 10 to receive print data for printing a search result page, together with advertisement data, and to provide information to computer 10 confirming a successful print out of the search result page and the advertisements.

Figure 2:
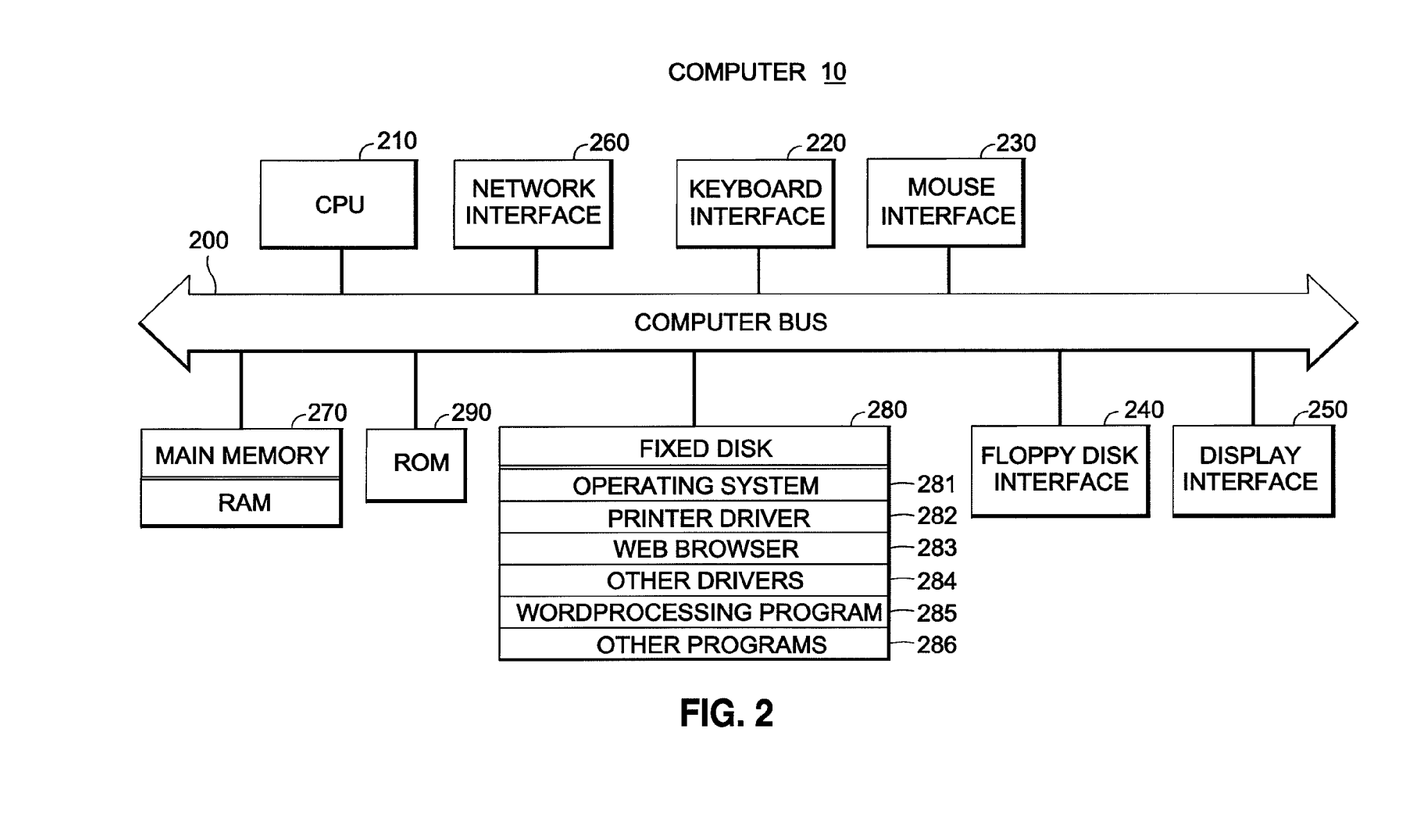
FIG. 2 depicts an example of an internal architecture of a computer workstation.

FIG. 2 is a block diagram showing an example of the internal architecture of a computer workstation, such as workstation 10. In FIG. 2, workstation 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a mouse or other pointing device, floppy disk interface 240 for interfacing to a floppy disk, display interface 250 for interfacing to a monitor or other display, and network interface 260 for interfacing to a network, such as Internet 11. Interface 260 may be, for example, a 56K modem, a DSL modem, a cable modem, an Ethernet card that may or may not communicate with an external modem, etc.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices (not shown) attached to workstation 10.

Fixed disk 280 is one example of a computer-readable medium that stores program instruction sequences executable by CPU 210. The program instructions may constitute windows operating system 281, printer driver 282, web browser 283, other drivers 284, word processing program 285, and other programs 286. Operating system 281 is preferably a windows operating system although the other types of operating systems may be used with the present invention. Printer driver 282 is utilized to prepare image data for printing on at least one image forming device, such as, for example, printer 30. Web browser application 283 is preferably a browser application such as Windows Internet Explorer®, Mozilla Firefox®, or Safari™, although other web browser applications may be utilized instead. However, the web browser should preferably support plug-ins such that, in a case where the present invention may be employed as a plug-in for a web browser, the invention may be installed and utilized with the web browser application. In addition, the web browser preferably supports various types of web page source code, including but not limited to, HTML, Java Script, etc. Other drivers 284 include drivers for each of the remaining interfaces which are coupled to computer bus 200. Word processing program 285 is a typical word processor program for creating documents and images, such as Microsoft® Word, or Corel® WordPerfect documents. Other programs 286 contains other programs necessary to operate workstation 20 and to run desired applications.

Figure 3:
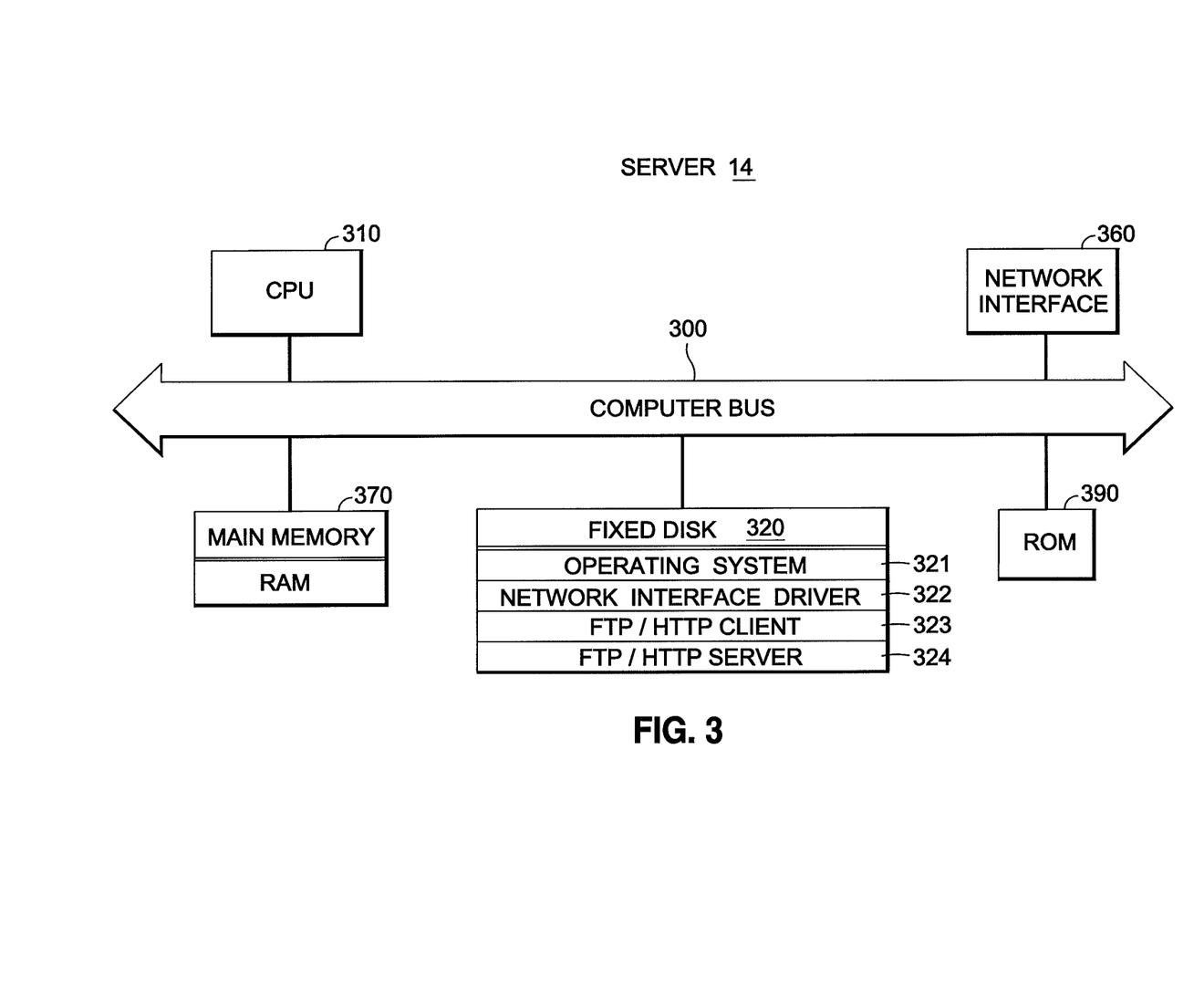
FIG. 3 depicts an example of an internal architecture of a web server.

FIG. 3 depicts a block diagram showing an overview of the internal architecture of a server, such as servers 12, 13 and 14. In this regard, the internal architecture of these servers may be similar, and the description will be made merely for ISP server 14. In FIG. 3, ISP server 14 is seen to include a central processing unit (CPU) 310 such as a programmable microprocessor which is interfaced to computer bus 300. Also coupled to computer bus 300 is a network interface 360 for interfacing to a network, such as Internet 11. In addition, random access memory (RAM) 370, fixed disk 320, and read-only memory (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 320 (or other memory media) into RAM 370 and executes those stored program instruction sequences out of RAM 370. It should also be recognized that standard disk-swapping techniques allow segments of memory to be swapped to and from RAM 370 and fixed disk 320. ROM 390 stores invariant instruction sequences, such as start-up instruction sequences for CPU 310 or basic input/output operating system (BIOS) sequences for the operation of peripheral devices which may be attached to server 30 (not shown).

Fixed disk 320 is one example of a computer-readable medium that stores program instruction sequences executable by CPU 310. The program instruction sequences may include operating system 321 and network interface driver 322. Operating system 321 can be an operating system such as Windows XP (or later versions thereof), UNIX, or other such server operating systems. Network interface driver 322 is utilized to drive network interface 360 for interfacing ISP server 14 to network (Internet) 11.

Server 14 also preferably includes FTP/HTTP client 323 to provide server 14 with the ability to retrieve and transmit data files via FTP and HTTP protocols over the network through network interface 360. In addition, FTP/HTTP server 324 can be accessed by an FTP/HTTP client in a workstation such as workstation 10. In this regard, FTP/HTTP server 324 is preferably a web server that can be accessed by web browser application 283 to retrieve and download web pages, which are preferably comprised of an HTML document. Of course, other types of web based documents which include source code supported by the web browser can be utilized and the invention is not limited to HTML. However, for the sake of brevity, the invention will be described with regard to HTML. A user wanting to access a web site to have a web page downloaded enters a URL (Uniform Resource Locator), or other type of location information where a web page may be stored, in the web browser of workstation 10, whereby the web page (in the form of an HTML document) is received by workstation 10 for display in the web browser. Having received the HTML document for the web page, the web browser interprets HTML source code in the HTML document to display the web page in the browser. The process of accessing web pages over the Internet or an Intranet is well known in the art and any process to have a web page downloaded and displayed in the web browser can be used to practice the invention. Having downloaded or otherwise accessed a web page, the web page is processed and displayed by the web browser for the user to view.

Figure 4:
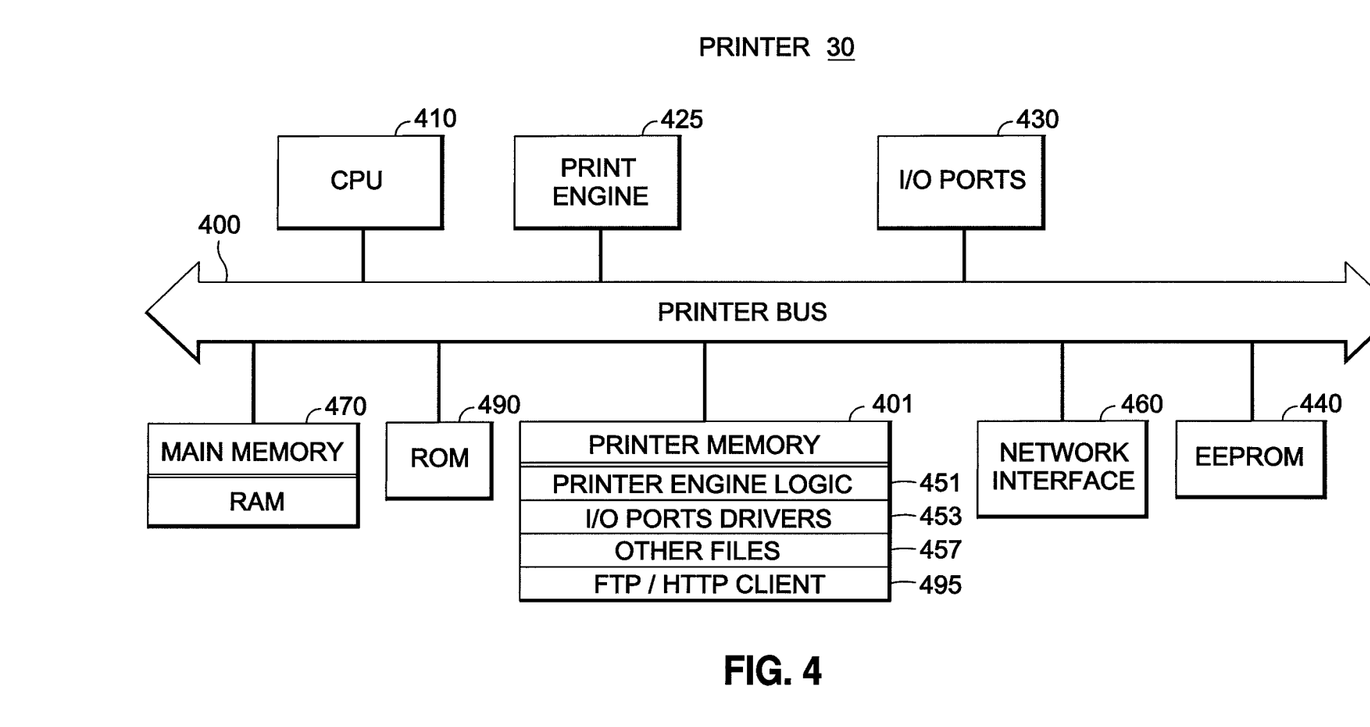
FIG. 4 depicts an example of an internal architecture of a printer.

FIG. 4 depicts a block diagram showing an example of the internal architecture of a printer, such as printer 30. In FIG. 4, printer 30 is seen to contain a central processing unit (CPU) 410 such as a programmable microprocessor which is interfaced to printer bus 400. Also coupled to printer bus 400 are I/O ports 430 which is used to communicate with various input/output devices of printer 30 (not shown), and network interface 460 which is utilized to interface printer 30 to network 11.

Also coupled to printer bus 400 are EEPROM 440, for containing non-volatile program instructions, random access memory (RAM) 470, printer memory 401 and read-only memory (ROM) 490. RAM 470 interfaces to printer bus 400 to provide CPU 410 with access to memory storage, thereby acting as the main run-time memory for CPU 410. In particular, when executing stored program instruction sequences, CPU 410 loads those instruction sequences from printer memory 401 (or other memory media) into RAM 470 and executes those stored program instruction sequences out of RAM 470. ROM 490 stores invariant instruction sequences, such as start-up instruction sequences for CPU 410 or BIOS sequences for the operation of various peripheral devices of printer 30 (not shown).

Printer memory 401 is one example of a computer-readable medium that stores program instruction sequences executable by CPU 410 so as to constitute printer engine logic 451, I/O port drivers 453, other files 457, and e-mail program 459. Printer engine logic 451 is utilized to drive the printer engine 425 of printer 30 so as to print an image according to image data received by printer 30, preferably over network 11. I/O port drivers 453 are utilized to drive the input and output devices (not shown) connected through I/O ports 430.

Other files 457 contain other files and/or programs for the operation of printer 30. Printer memory 401 also includes FTP/HTTP client 495 which provides the ability to retrieve files over the network through network interface 460.

Figure 5:
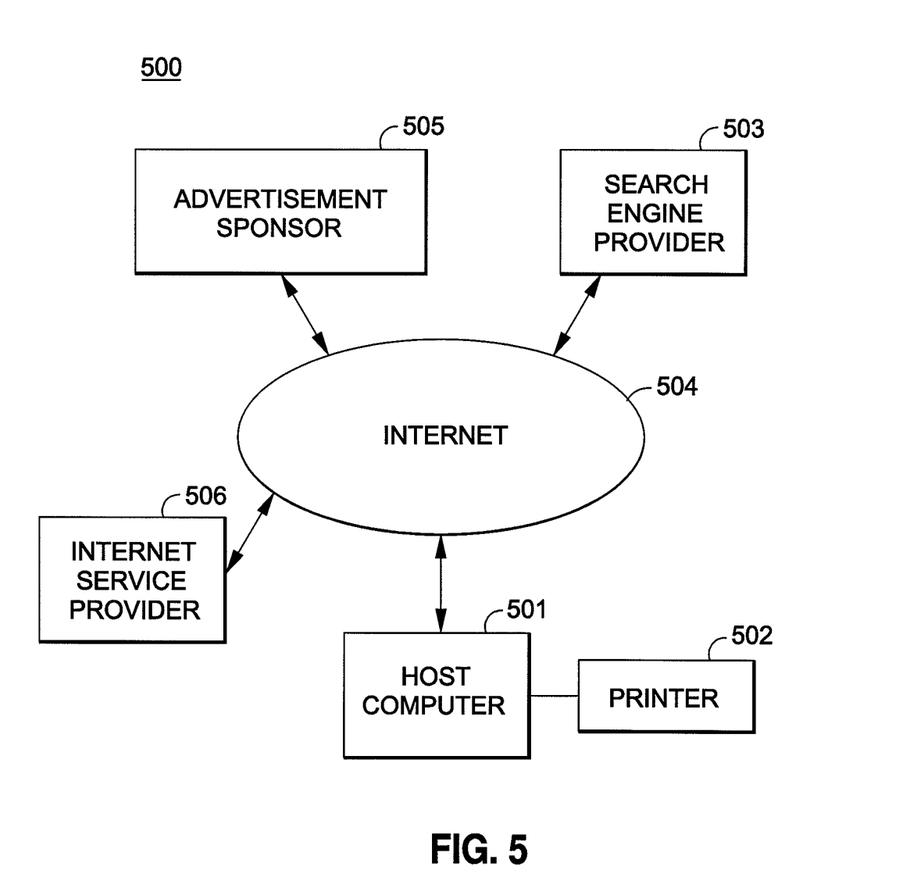
FIG. 5 depicts a block diagram of an example configuration of an Internet advertising revenue sharing system.

FIG. 5 depicts a block diagram of an example configuration for providing a system of sharing Internet advertising revenue according to the present invention. As seen in FIG. 5, an Internet advertising revenue sharing system 500 includes a host computer 501 (comparable to computer 10), a printer 502 (comparable to printer 30), an Internet Service Provider 506 (comparable to server 14), a Search Engine Provider 503 (comparable to server 12), an Advertisement Sponsor 505 (comparable to server 13), each of which communicate with one anther via Internet 504. The host computer 501 may be any type of personal computer capable of connecting to and browsing the Internet 504. The host computer 501 accesses the search engine provider 503 via the Internet 504 and Internet Service Provider 506 using a web browser. The host computer 501 is also connected to the printer 502, which may be any type of printer that forms printouts on a recording medium such as paper or the like.

The search engine provider 503 may be any type of search engine provider, such as Google™, Yahoo!®, or MSN®, that provides a web search engine to search for information on the World Wide Web. The web search engine provider provides search results in the form of a web page referred to as a search engine result page (SERP).

In practicing the Internet advertising revenue sharing system of the invention, the search engine provider 503 normally enters into a contractual agreement with the advertisement sponsor 505 to have advertisements from the sponsor displayed in conjunction with the search engine web page/results page. That is, the search engine provider agrees to include advertisements themselves or links to various advertisement websites hosted by the advertisement sponsor in exchange for monetary compensation paid by the advertisement sponsor to the search engine provider. As discussed above with regard to the prior art, this type of arrangement is typically for the display of advertisements that are clicked-on by the end user, whereby the advertisement sponsor would pay the search engine provider for each click of the link. In the invention, however, as will be described in more detail below, the arrangement is made based not on a link for the advertisement being clicked-on, but based on the advertisement being printed out with a search results page.

As another feature in implementing the invention, an end user of the web search engine enters into an agreement with the search engine provider to become a member of the advertising revenue sharing system. That is, the end user registers with the search engine provider through a registration process as described in more detail below. As will be described in more detail below, the actual sharing of the Internet advertising revenue occurs by the search engine provider crediting a portion of the money paid by the advertisement sponsor for the advertisement to the end user's account. As will be described in more detail below, the credit occurs after confirmation that the advertisement was printed out in conjunction with printing of a search results page by the end user.

Thus, as seen in FIG. 5, a host computer 501 of the end user communicates with printer 502, which is preferably connected locally to the host computer. Host computer 501 also communicates with Internet Service Provider 506 via Internet 504 to access the Internet when the end user invokes a browser in the host computer. After gaining access to the Internet via the ISP, when the end user enters a URL for the search engine provider in the browser, the host computer accesses the SEP 503 via Internet 504 and a webpage for the SEP is displayed in the browser. Advertisement Sponsor 505 can also communicate with SEP 503 to establish the revenue sharing contractual agreement, and to provide advertising content to SEP 503 that can be included in the search results page for printing. In addition, Advertisement Sponsor 505 can communicate directly with host computer 501 to provide advertisement content to the host computer. As will be described in more detail below, in one embodiment, a plug-in in the web browser requests content from the Advertisement Sponsor to be embedded in a printout of the search results page when the end user opts to have the search results page printed out.

Figure 6:
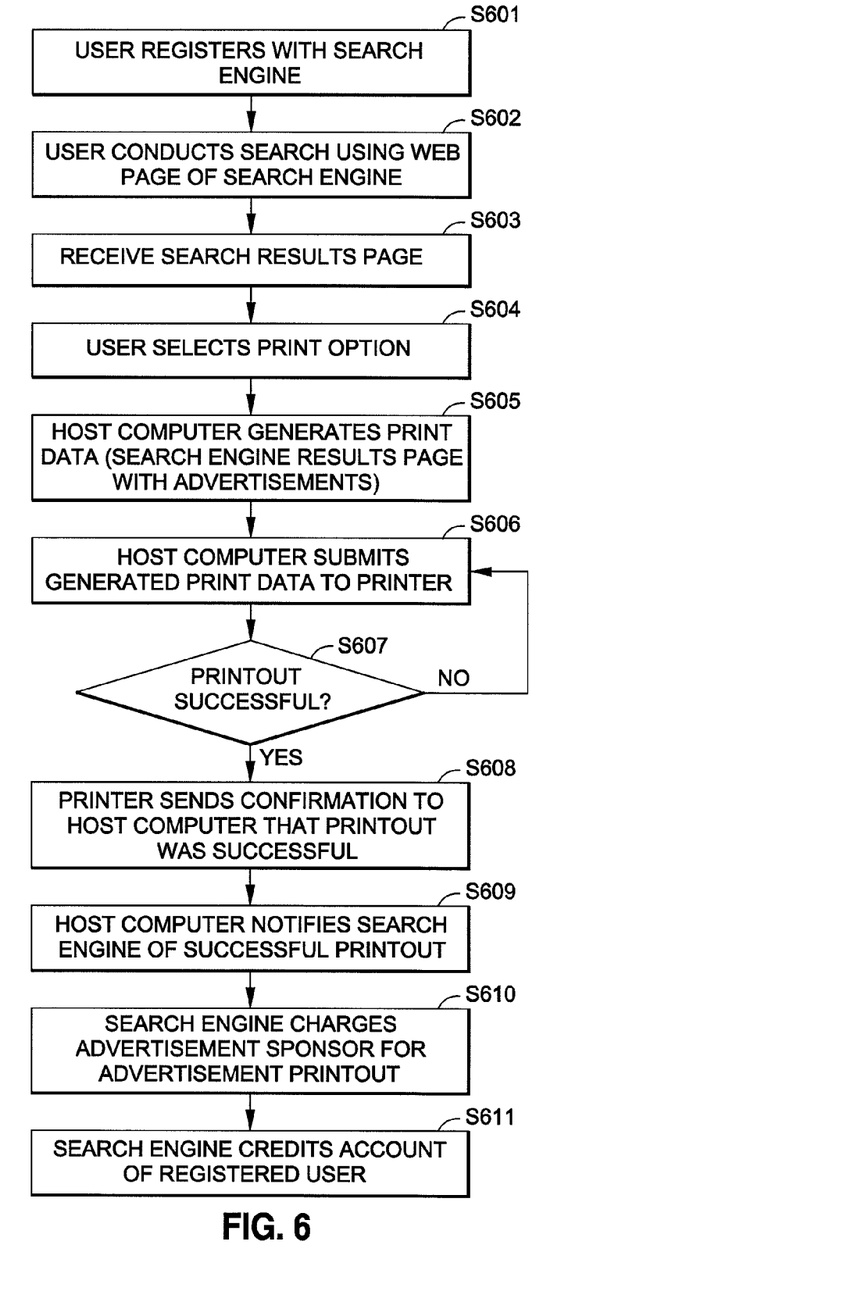
FIG. 6 depicts a process flow chart according to the example configuration of the Internet advertising revenue sharing system.

FIG. 6 is a process flow chart depicting process steps that implement one example of the Internet advertising revenue sharing system of the invention. The process shown in FIG. 6 utilizes the configuration shown in FIG. 5, including host computer 501, printer 502, search engine provider 504, advertisement sponsor 505, and Internet service provider 506. It is noted that FIG. 6 does not depict a process for the advertisement sponsor to enter into a revenue sharing agreement with the search engine provider. In this regard, any commonly known process for advertisement sponsors to enter into agreements with search engine providers for the advertisement sponsor to pay the search engine provider for displaying advertisements can be utilized in practicing the invention. As will be described with regard to FIG. 6, however, the invention provides for the search engine provider to provide a portion of the revenue paid by the advertisement sponsor to end user's who want to participate in the revenue sharing system. Thus, FIG. 6 is directed primarily to the process involved for an end user to take part in the system.

More specifically, in step S601 of FIG. 6, a user of the host computer 501 registers with the search engine provider 503 as a participant in the Internet advertising revenue sharing system managed by the search engine provider 503. The user may register with the search engine provider 503 by, for example, signing up through the search engine provider's web site, calling the search engine provider by telephone, or sending a registration form to the search engine provider through the postal service. Of course, any other method of registering for a product or service can be used and the invention is not limited to the foregoing. Additionally, it is not mandatory that users of the search engine register with the search engine provider in order to utilize the search function of the search engine provider, but users are merely provided with the option to register if they desire.

When the user registers with the search engine provider to participate in the advertisement revenue sharing system, they may, for example, be presented with a webpage (preferably a secure webpage) to enter personal information to set up an account. For example, the user may be requested to input items such as their name, address, telephone number, or an e-mail address. The user may also be requested/required to input some type of financial institution information, such as a bank account or credit card number. In this manner, if the revenue sharing system so provides, the user may be provided with cash that is deposited into a bank account of the user. Alternatively, the search engine provider may credit an account of the user a predetermined number of points for each advertisement printing transaction. The end user may then redeem their points for coupons or discounts on purchases that can be made through the search engine provider or otherwise, including discounts on the purchase of printing supplies such as ink and paper. Of course, other types of credits can be provided to the end user and the invention is not limited to any particular type of credit or cash disbursement.

In step S602, after the user has registered with the search engine provider to participate in the advertisement revenue sharing system, the user of the host computer 501 conducts a search which utilizes a web page of the search engine provider 503. That is, the user activates a web browser on computer 501 and enters a URL of the search engine provider. An HTML webpage of the search engine provider is downloaded to and displayed by the browser. The user may then conduct a search for information such as web-sites, images, videos, businesses, products, services, etc., by entering keywords or search terms into a search dialog box on the displayed webpage of the search engine provider. When the user submits a request to have the search conducted, the search engine provider conducts a search for information relevant to the input keywords and generates a search results page. The search result page is then provided to and displayed by the browser of the host computer 501 (step S603). An example of a search results page is shown in FIG. 7.

Figure 7:
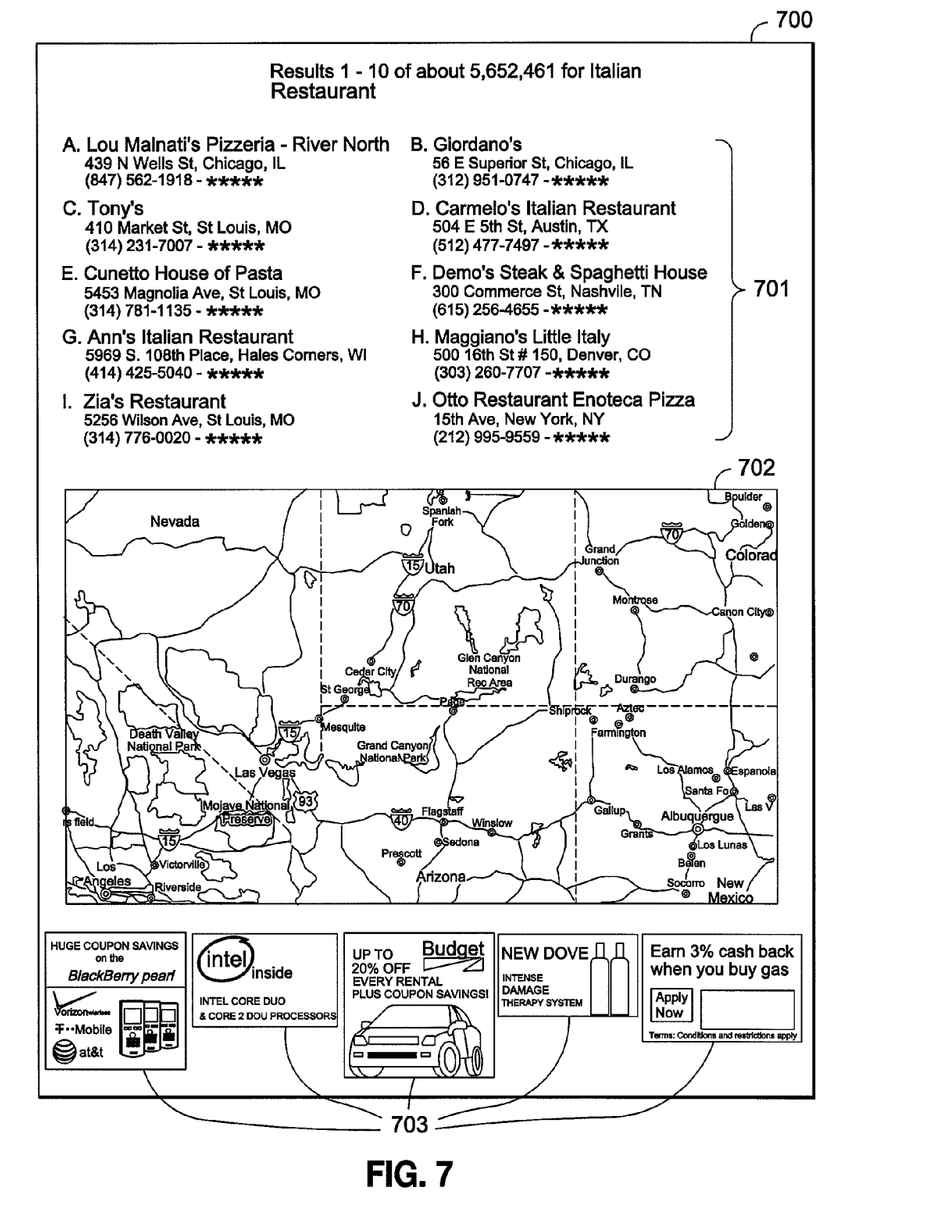
FIG. 7 depicts an illustration of an example printout of a search result page with inserted advertisement data resulting from the Internet advertising revenue sharing system.

Briefly, referring to FIG. 7, depicted therein is an example printout of a search results page with inserted advertisement data. As shown in FIG. 7, print data 700 is a printout printed from printer 502 and includes search results 701 and 702 and advertisement data 703. Print data 700 is the result of printing out a search results page as a user of the Internet advertising revenue sharing system. The search results 701 and 702, as shown in FIG. 7, are a list of businesses, addresses and phone numbers for each of the found businesses, and a corresponding map, respectively. However, the search results 701 and 702 may also include, but are not limited to, driving directions, relevant web sites, a list of image thumbnails, or a list of products or services for sale.

The advertisement data 703, as shown in FIG. 7, is provided by the advertisement sponsor 505 to the search engine provider 503 and consists of advertisements for different products. However, the advertisement data 703 may also include, but is not limited to, advertisements for services, coupons, announcements, or show times for local television programming or movie theaters. Moreover, FIG. 7 shows advertisement data 703 positioned at the bottom of print data 700. However, the advertisement data 703 may also be positioned at the top, side margins, or on the back of print data 700. Additionally, the advertisement data 703 may vary in size, shape, and the amount of detail displayed in the graphics, and can either contain color or black and white graphics.

It should be noted that the search results page may be prepared by the search engine provider with advertisement content embedded in the page. That is, when the user submits the search request, based on the input keywords/search terms, and the search results obtained as a result of the search conducted by the search engine provider, the search engine provider may also search a database of advertising content to obtain advertisements that are related to the subject matter of the search. For example, if the end user conducts a search for car wash businesses in a particular locale, the search engine provider may search a database for advertisements relevant to car washing in general (e.g., advertisements for car washing material such as soap, wax, pressure washers, etc.), or advertisements relevant to car wash businesses that may be included in the search results. The search engine provider may also refer to personal information of the end user's account to determine topics of interest to the user in order to determine which advertisements the user may be more willing to want to receive, including advertisements that may be relevant to a topic other than the subject matter of the search. Once the search engine provider has obtained the relevant advertising content, it may embed the advertisements in the search results page that is provided to the web browser for display. Thus, referring again to FIG. 7, various advertisements 703 can be seen displayed in the search results page displayed by the browser.

Referring again to FIG. 6, in step S604, once the search results page is displayed by the browser, the user of the host computer 501 may select an option in the browser to print the displayed search result page on the printer 502 which is connected to the host computer 501. In a case where the user has registered with the search engine provider to participate in the revenue sharing system, and the search results page has been embedded with the advertisements by the search engine provider when the page is downloaded, the process proceeds to generate print data for submission to the printer based on the displayed search results page that already includes the embedded advertisements (step S605). Here, it is noted that an alternative embodiment may be that the search results page is not embedded with the advertisement content by the search engine provider when the search results page is downloaded to the browser, but rather, the search results page is downloaded without advertisements. Thus, to accomplish the invention, the search results page would need to have advertisements embedded after the downloading to the browser. This alternative embodiment will be described in more detail below. As another alternative, when selecting the print option, the user may have the option of printing the search results page without advertisements and therefore not participating in the Internet advertising revenue sharing system for the current print request. That is, the print driver, when the print option is invoked, may provide an option for the user to deselect printing of advertisements that have been embedded in the search results page. In this case, no revenue sharing would be accomplished and a normal print operation of printing the search results page without advertisements would occur. In keeping with the invention, however, once the user confirms the printout with the advertisements, a print driver in the host computer 501 generates print data based on the displayed search results page and advertisements, and the generated print data is transmitted to printer 502 to print out the search result page together with advertisement data (step S606).

As mentioned above, in an alternative embodiment, the search engine provider downloads the search result page without advertisement content embedded in the search results page. Thus, to accomplish the invention, when the user invokes the print driver to print out the search results page, and if the user selects an option in the print driver to print out the search results page with advertisements, a plug-in software module for the browser may be invoked to request the downloading of advertising content to be embedded in the search results page for printing. The request may be submitted to the search engine provider, whereby the search engine provider searches the advertising content database as described above and then downloads the advertisements to the browser. The plug-in may, of course, request the advertising content from another source, including directly from the advertisement sponsor, and the invention is not limited to obtaining the advertisement content from the search engine provider. Regardless, once the advertisement data is downloaded to the browser, the plug-in handles the content so that it may be included in the printout. For instance, the search results page displayed on the browser may be refreshed or updated to include the advertisements so that a graphics driver for the printer driver can then generate print data for the search results page to include the advertisements for printout. As yet another alternative, the plug-in may request that the search engine provider download a newly-generated search results page that includes the advertisements such that the newly-generated search results page would be along the lines of that of the first embodiment in which the search results page originally downloaded by the search engine provider is embedded with the advertisements.

Returning to FIG. 6, in step S607, the printer determines whether the printout of print data with the advertisement data was successful. If the printout was successful, the printer informs the printer driver that the printout was successful (step S608). The plug-in for the browser then informs the search engine provider that the printout of the generated print data, which includes the advertisement data, was successful (step S609). If the printout was not successful, then more than likely an error occurred in the processing of the print job and the user is informed of the error. If the user attends to the error, the user may then resubmit the print job, and thus, the process returns to step S606.

The search engine provider, upon receiving the notification that the printout of the search results page with the advertisements was successful, charges the advertisement sponsor for the printing of the advertisement data in accordance with the contractual agreement entered into between the advertisement sponsor and the search engine provider (step S610). The amount charged to the advertisement sponsor may vary, depending on, for example, the size of the advertisement data, the location of the advertisement data in the printout, or the detail and quality of the advertisement data, again, depending on the agreement. In step S611, the search engine provider credits an account of the registered user a portion of the amount charged to the advertisement sponsor for the printing of the advertisement data. As discussed above, the credit may be in the form of a monetary payment to a bank account, a point credit to the end user's account, etc. The user may then exchange the account credits, for example, to get cash back, to get new printer ink cartridges, or to get other merchandise. As a result, the user has an incentive to print search result pages which contain the advertisement data provided by advertisement sponsor 505.

The foregoing description has been made of various software modules being executed by computer hardware to implement the invention. Thus, the system of the invention may be realized by the various computer hardware components in conjunction with the software modules. Of course, the process of the invention may also be constituted by software code that is stored on a computer readable storage medium, such as a compact disk (CD), a read only memory (ROM), or any other type of computer storage medium on which software codes may be encoded. Thus, the invention may be comprised of such software codes stored on the computer readable medium.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of sharing revenue in an Internet printing system comprising a server computer of a search engine provider company, a host computer capable of browsing the Internet, and a server computer of an advertisement sponsor, the method comprising:
   in the host computer, performing the steps of:
   registering a user of the host computer with the search engine provider server computer as a participant in an Internet advertisement revenue sharing system managed by the search engine provider company, thereby establishing an account for the registered user;
   conducting, on behalf of the registered user, an Internet search utilizing a web page of the search engine provider server computer, the search resulting in a search result page being displayed on a browser of the host computer;
   receiving a selection to print the displayed search result page with advertisement data included therein on a printer connected to the host computer;
   receiving advertisement data of the advertisement sponsor after receiving the selection to print the displayed search result page with advertisement data included therein;
   generating print data to print out the search result page together with the received advertisement data of the advertisement sponsor in addition to the search result;
   submitting the generated print data and received advertisement data to the printer for printing in accordance with the selection by the user of the host computer to print the displayed search result page;
   receiving a confirmation message from the printer confirming that the printout of the received advertisement data in addition to the search result page was successful; and
   notifying the search engine provider server computer that the printout of the received advertisement data in addition to the search result page was successful,
   and, in the search engine provider server computer, performing the steps of:
   receiving the notification from the host computer that the printout of the advertisement data in addition to the search result page was successful;
   submitting a charge to an account of the advertisement sponsor for the printing of the advertisement data included in the printout; and
   submitting a credit to the account of the registered user for the selection to print the advertisement data in addition to the search result page, the credit corresponding to a portion of the amount charged to the advertisement sponsor for the printing of the advertisement data,
   wherein the user that registered with the search engine provider is the same user that is associated with the search, the printing of the search result page, and the account of the registered user that receives the credit.

2. The method according to claim 1, further comprising, in response to the selection to print the search result page with advertisement data included therein, the search engine provider server computer preparing the advertisement data for the printout, and downloading the advertisement data to the host computer.

3. The method according to claim 2, wherein the downloaded advertisement data for the printout is handled by a plug-in to the browser that prepares a print job that includes the search result page and the downloaded advertisement data.

4. The method according to claim 1, wherein a plug-in to the browser generates the print data, receives the confirmation from the printer, and notifies the search engine provider server computer of the successful printing.

5. The method according to claim 1, wherein the advertisement data is provided to the host computer by the search engine provider server computer, and wherein the search engine provider server computer searches for advertisement data related to content of the search result page, and downloads the searched-for advertisement data.

6. The method according to claim 1, wherein the search engine provider server computer obtains advertisement data related to an input search term of the search conducted by the user and downloads the obtained related advertisement data to the host computer.

7. The method according to claim 1, wherein the search engine provider server computer obtains advertisement data related to topics of interest of the registered user of the host computer based on personal information of the registered user's account, and downloads the obtained related advertisement data to the host computer.

8. A non-transitory computer-readable storage medium on which is stored computer executable code of a program that, when executed, performs a method of sharing revenue in an Internet printing system comprising a server computer of a search engine provider company, a host computer capable of browsing the Internet, and a server computer of an advertisement sponsor, the method comprising:
   in the host computer, performing the steps of:
   registering a user of the host computer with the search engine provider server computer as a participant in an Internet advertisement revenue sharing system managed by the search engine provider company, thereby establishing an account for the registered user;
   conducting, on behalf of the registered user, an Internet search utilizing a web page of the search engine provider server computer, the search resulting in a search result page being displayed on a browser of the host computer;
   receiving a selection to print the displayed search result page with advertisement data included therein on a printer connected to the host computer;
   receiving advertisement data of the advertisement sponsor after receiving the selection to print the displayed search result page with advertisement data included therein;
   generating print data to print out the search result page together with received advertisement data of the advertisement sponsor in addition to the search result;
   submitting the generated print data and the received advertisement data to the printer for printing in accordance with the selection by the user of the host computer to print the displayed search result page;

receiving a confirmation message from the printer confirming that the printout of the received advertisement data in addition to the search result page was successful; and notifying the search engine provider server computer that the printout of the received advertisement data in addition to the search result page was successful, and, in the search engine provider server computer, performing the steps of:

receiving the notification from the host computer that the printout of the advertisement data in addition to the search result page was successful;

submitting a charge to an account of the advertisement sponsor for the printing of the advertisement data included in the printout; and submitting a credit to the account of the registered user for the selection to print the advertisement data in addition to the search result page, the credit corresponding to a portion of the amount charged to the advertisement sponsor for the printing of the advertisement data, wherein the user that registered with the search engine provider is the same user that is associated with the search, the printing of the search result page, and the account of the user that receives the credit.

9. A search engine provider server computer of a search engine provider company, for sharing revenue in an Internet printing system comprising the search engine provider server computer, a host computer capable of browsing the Internet, and a server computer of an advertisement sponsor, comprising:

a receiving unit for receiving, from the host computer, a request for advertisement data of the advertisement sponsor;

a charging submission unit for, upon receiving a notification from the host computer that a printout of downloaded advertisement data in addition to a search result page was successful, submitting a charge to an account of the advertisement sponsor for the printing of the advertisement data included in the printout; and a credit submitting unit for submitting a credit to an account of a registered user for the registered user's selection of an option to print the advertisement data in addition to the search result page, the credit corresponding to a portion of an amount charged to the advertisement sponsor for the printing of the advertisement data, wherein:

a user of the host computer registers with the search engine provider server computer as a participant in an Internet advertisement revenue sharing system managed by the search engine provider company, thereby establishing the account for the registered user, the host computer conducts, on behalf of the registered user, an Internet search utilizing a web page of the search engine provider server computer, the search resulting in a search result page being displayed on a browser of the host computer, the host computer receives a selection to print the displayed search result page with advertisement data included therein on a printer connected to the host computer;

the host computer-receives the downloaded advertisement data of the advertisement sponsor after receiving the selection to print the displayed search result page with advertisement data included therein;

the host computer-generates print data to print out the search result page together with the received advertisement data of the advertisement sponsor in addition to the search result;

the host computer submits the generated print data and the received advertisement data to the printer for printing in accordance with the selection by the user of the host computer to print the displayed search result page;

the host computer-receives a confirmation message from the printer confirming that the printout of the advertisement data in addition to the search result page was successful; and the host computer-notifies the search engine provider server computer that the printout of the received advertisement data in addition to the search result page was successful, and wherein the user that registered with the search engine provider is the same user that is associated with the search, the printing of the search result page, and the account of the registered user that receives the credit.

10. The search engine provider server computer according to claim 9, wherein in response to the selection to print the search result page with advertisement data included therein, the search engine provider server computer prepares the advertisement data for the printout, and downloads the advertisement data to the host computer.

11. The search engine provider server computer according to claim 10, wherein the downloaded advertisement data for the printout is handled by a plug-in to the browser that prepares a print job that includes the search result page and the downloaded advertisement data.

12. The search engine provider server computer according to claim 9, wherein a plug-in to the browser generates the print data, receives the confirmation from the printer, and notifies the search engine provider server computer of the successful printing.

13. The search engine provider server computer according to claim 9, wherein the advertisement data is provided to the host computer by the search engine provider server computer, and wherein the search engine provider server computer searches for advertisement data related to content of the search result page, and downloads the searched-for advertisement data.

14. The search engine provider server computer according to claim 9, wherein the search engine provider server computer obtains advertisement data related to an input search term of the search conducted by the user and downloads the obtained related advertisement data to the host computer.

15. The search engine provider server computer according to claim 9, wherein the search engine provider server computer obtains advertisement data related to topics of interest of the registered user of the host computer based on personal information of the registered user's account, and downloads the obtained related advertisement data to the host computer.

16. A host computer capable of browsing the Internet, for sharing revenue in an Internet printing system comprising a search engine provider server computer of a search engine provider company, the host computer, and a server computer of an advertisement sponsor, comprising:

a registration unit for registering a user of the host computer with the search engine provider server computer as a participant in an Internet advertisement revenue sharing system managed by the search engine provider company, thereby establishing an account for the registered user;

a searching unit for conducting, on behalf of the registered user, an Internet search utilizing a web page of the search engine provider server computer, the search resulting in a search result page being displayed on a browser of the host computer;

a print receiving unit for receiving a selection to print the displayed search result page with advertisement data included therein on a printer connected to the host computer;

an advertisement data receiving unit for receiving advertisement data of the advertisement sponsor after receiving the selection to print the displayed search result page with advertisement data included therein;

a generating unit for generating print data to print out the search result page together with the received advertisement data of the advertisement sponsor in addition to the search result;

a submission unit for submitting the generated print data and the received advertisement data to the printer for printing in accordance with the selection by the user of the host computer to print the displayed search result page;

a confirmation reception unit for-receiving a confirmation message from the printer confirming that the printout of the received advertisement data in addition to the search result page was successful;

a notification unit for-notifying the search engine provider server computer that the printout of the received advertisement data in addition to the search result page was successful, wherein:

the search engine provider server computer, receives the notification from the host computer that the printout of the advertisement data in addition to the search result page was successful;

the search engine provider server computer submits a charge to an account of the advertisement sponsor for the printing of the advertisement data included in the printout; and the search engine provider server computer submits a credit to the account of the registered user for the selection to print the advertisement data in addition to the search result page, the credit corresponding to a portion of the amount charged to the advertisement sponsor for the printing of the advertisement data, and wherein the user that registered with the search engine provider is the same user that is associated with the search, the printing of the search result page, and the account of the registered user that receives the credit.

17. The host computer according to claim 16, wherein in response to the selection to print the search result page with advertisement data included therein, the search engine provider server computer prepares the advertisement data for the printout, and downloads the advertisement data to the host computer.

18. The host computer according to claim 17, wherein the downloaded advertisement data for the printout is handled by a plug-in to the browser that prepares a print job that includes the search result page and the downloaded advertisement data.

19. The host computer according to claim 16, wherein a plug-in to the browser generates the print data, receives the confirmation from the printer, and notifies the search engine provider server computer of the successful printing.

20. The host computer according to claim 16, wherein the advertisement data is provided to the host computer by the search engine provider server computer, and wherein the search engine provider server computer searches for advertisement data related to content of the search result page, and downloads the searched-for advertisement data.

21. The host computer according to claim 16, wherein the search engine provider server computer obtains advertisement data related to an input search term of the search conducted by the user and includes downloads the obtained related advertisement data to the host computer.

22. The host computer according to claim 16, wherein the search engine provider server computer obtains advertisement data related to topics of interest of the registered user of the host computer based on personal information of the registered user's account, and downloads the obtained related advertisement data to the host computer.

* * * * *